(12) United States Patent
Yeung

(10) Patent No.: US 6,617,515 B1
(45) Date of Patent: *Sep. 9, 2003

(54) POLYTETRAFLUOROETHYLENE COATING MATERIAL FOR LASER MARKING

(75) Inventor: Chor Keung Yeung, Langres (FR)

(73) Assignee: Compagnie Plastic Omnium, Lyons (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/619,976

(22) Filed: Mar. 20, 1996

(30) Foreign Application Priority Data

Mar. 20, 1995 (FR) .............................. 95 03195

(51) Int. Cl.$^7$ ................................. H01B 7/36
(52) U.S. Cl. ............. 174/112; 174/110 R; 174/110 FC; 428/421; 428/422; 524/497; 524/546
(58) Field of Search ................. 524/430, 431, 524/497, 546, 531, 592; 174/110 R, 110 FC, 112; 428/421, 422

(56) References Cited

U.S. PATENT DOCUMENTS

| 4,808,966 A | * | 2/1989 | Ferlier et al. | ................ 338/214 |
| 4,894,419 A | * | 1/1990 | Mizuno et al. | ............. 525/189 |
| 5,091,284 A | * | 2/1992 | Bradfield | .................... 430/292 |
| 5,320,789 A | * | 6/1994 | Nishii et al. | ................... 264/22 |
| 5,415,939 A | * | 5/1995 | Yeung | ........................ 428/422 |

FOREIGN PATENT DOCUMENTS

| EP | 0 367 629 | 5/1990 |
| WO | WO 90/08805 | 8/1990 |

* cited by examiner

*Primary Examiner*—James J. Seidleck
*Assistant Examiner*—U. K. Rajguru
(74) *Attorney, Agent, or Firm*—Oliff & Berridge, PLC

(57) ABSTRACT

A coating material based on polytetrafluoroethylene (PTFE) containing pigments and suitable for marking with a UV laser includes raw PTFE, 0.01 to 5 wt. % titanium oxide pigment, and 0.1 to 5 wt. % of one or more of arylene sulfide polymers, particularly polyphenylene sulfide (PPS); polyarylsulfones, in particular polysulfone (PSU) or polyethersulfone (PES); and polyaryletherketones, in particular polyetherketone (PEK) or polyetheretherketone (PEEK).

9 Claims, No Drawings

POLYTETRAFLUOROETHYLENE COATING MATERIAL FOR LASER MARKING

BACKGROUND OF THE INVENTION

The present invention relates to a coating material based on polytetrafluoroethylene (PTFE) suitable for marking by a laser. More particularly, the present invention relates to a PTFE coating material containing pigments and suitable for marking with a UV laser, especially, a laser emitting radiation in the ultraviolet range.

A laser beam projected onto the surface of a coating material causes a change in the chemical structure of the pigments in the impact areas such that markings, particularly labels, appear by contrast with the surface areas of the material that have not been subjected to the action of the laser beam.

Such PTFE materials, suitable for laser marking, are used principally as surface coatings for electrical cables. In this case, the material provides an insulation function like traditional PTFE coatings and is also able to receive cable identification markings by marking with a laser.

Known materials of this type normally use titanium dioxide ($TiO_2$) as a pigment.

However, it has been found that the contrast of the markings produced by irradiating these pigments with a UV laser is usually only approximately 70%, which is unsatisfactory. Further, the change in chemical structure of the $TiO_2$ pigment is not irreversible as contrast continues to decrease with aging.

Thus, with aging at 260° C., a PTFE coating containing 2% $TiO_2$ underwent a decrease in contrast of approximately 10% in 168 hours.

SUMMARY OF THE INVENTION

The present invention relates to a coating material suitable for UV laser marking offering improved contrast quality that is stable over time.

More particularly, the present invention relates to a coating material suitable for marking with a UV laser, said material comprising:

A) raw PTFE;

B) 0.01 to 5 wt. % titanium oxide pigments; and

C) 0.1 to 5 wt. % of one or more organic polymers selected from the group consisting of arylene sulfide polymers, polyarylsulfones, and polyaryletherketones.

DESCRIPTION OF PREFERRED EMBODIMENTS

The present invention relates to a material made of raw PTFE to which 0.01 to 5 wt. % titanium oxide pigments have been added. It includes 0.1 to 5 wt. % of one or more organic polymers selected from the group consisting of arylene sulfide polymers, including but not limited to polyphenylene sulfide (PPS); polyarylsulfones, polysulfone (PSU), and polyethersulfone (PES); and polyaryletherketones, in particular polyetherketone (PEK) and polyetheretherketone (PEEK).

The material according to the invention includes raw PTFE, i.e., PTFE that has never been brought to a temperature higher than the PTFE gel point or sintering point, which is approximately 350° C.

Surprisingly, it has been found that the addition of such organic polymers increases the marking contrast produced with a UV laser, with the marking contrast obtained reaching, and often exceeding, 80%.

Moreover, these organic polymers are stable at temperatures of approximately 250° C.—some even more such that the contrast stability obtained is ensured upon aging at such temperatures.

If it is desired to make coatings that are not white but slightly colored, 0.05 to 3 wt. % of a colored pigment, such as a titanate, can be added.

The coating material according to the present invention can be made in the form of a strip with the above-indicated composition by the known process of lubricated, extrusion, the strip being wound onto the surface of an article, for example, an electrical cable, to be marked by a laser.

The lubricated extrusion process includes mixing the PTFE-powder-based composition with a lubricant to make a compact preform that is then subjected to extrusion, wherein a plunger forces the composition through a die in order to form a shape, such as a flat strip or a cylindrical rod.

This shape can then be calendered between two rolls to produce a thin strip, whereupon the lubricant is removed, preferably by drying or, if necessary, with the aid of a solvent.

If desired, the strip thus obtained can be subjected to a stage of dedensification by stretching, for example, by passing the strip successively over rolls driven at linear peripheral speeds that are in a ratio to the elongation to be conferred on the strip, or by subjecting the strip to the action of a tensioning device that exerts on the strip a force corresponding to the deformation to be conferred thereon.

If necessary, the strip can be stretched after it has been heated.

The coating material according to the invention can also be made in the form of a varnish having the above-indicated composition in an aqueous dispersion, which can be applied to the article to be coated by dipping, with the dipping stage being followed by drying.

Once applied, the coating material is heated to cure it at a temperature higher than the PTFE sintering point.

A number of examples of coating materials according to the present invention will now be described.

EXAMPLE 1

By lubricated extrusion, a strip composed of raw PTFE including 1.5 wt. % micronized PEEK and 1% $TiC_2$ is produced. The strip, blank, has a thickness of 64 $\mu$m and a density of 1.58 and is used to cover an electrical cable.

It is marked with an excimer laser set to an intensity of 1 $J/cm^2$.

A marking contrast of 82% is obtained.

An aging operation is then conducted in a 260° C. oven for 168 hours.

After this aging, the contrast is found still to be 79%.

EXAMPLE 2

A strip with the same characteristics as that of Example 1 is made by subjecting a raw PTFE composition containing 1% micronized PTFE and 1% $TiO_2$ to lubricated extrusion.

A marking contrast of 78% is obtained.

EXAMPLE 3

A strip is made from raw PTFE containing 1% micronized PEEK, 1% $TiO_2$, and 0.5 cobalt blue by lubricated extrusion to obtain a pale blue strip.

A marking contrast of 76% is obtained.

EXAMPLE 4

A strip is made by lubricated extrusion of a mixture of raw PTFE containing 1% micronized PEEK, 1% $TiO_2$, and 0.5% cobalt titanate to obtain a pale green strip.

A marking contrast of 80% is obtained.

EXAMPLE 5

A two-layer strip is made by co-extrusion of a lubricated mixture of raw PTFE containing 1% micronized PEK and a lubricated mixture of raw PTFE containing 1% $TiC_2$.

After winding this two-layer strip onto a cable such that the layer containing the PEK is always present on the outside, a marking contrast higher than 88% is found.

EXAMPLE 6

A solution of PES in dichloroethane was prepared and then the PES is precipitated by adding the solution dropwise to a dispersion of $TiO_2$ in propanol.

The solid particles are extracted by filtration and dried.

The PES/$TiO_2$ ratio by weight in this mixture is approximately 1.

A strip containing raw PTFE and 2% of the above mixture is made by lubricated extrusion.

A marking contrast of 80% is found.

EXAMPLE 7

PEK is dissolved in methanesulfonic acid and the solution is added to an aqueous dispersion of PTFE containing 2% $TiO_2$ and 2% chromium yellow titanate.

A thin yellow film is obtained, which is deposited on a cable by dipping followed by drying.

A marking contrast of 78% is found.

While this invention has been described in conjunction with specific embodiments thereof, it is evident that alternatives, modifications, and variations will be apparent to those skilled in the art. Accordingly, the preferred embodiments of the invention as set forth herein are intended to be illustrative, not limiting. Various changes may be made without departing form the spirit and scope of the invention as defined in the following claims.

What is claimed is:

1. A marked article, comprising:
   an article with a surface comprising a composition comprising:
   A) PTFE;
   B) 0.01 to 5 wt. % of at least one titanium oxide pigment; and
   C) 0.1 to 5 wt. % of at least one organic polymer selected from the group consisting of arylene sulfide polymers, polyarylsulfones and polyetherketones,
   wherein said surface of said article has label marked with a laser over less than an entire surface of said composition.

2. A marked article according to claim 1, wherein said composition is in the form of a coating.

3. A marked article according to claim 2, wherein said article is a cable.

4. A marked article according to claim 3, wherein said cable is an electrical cable.

5. A marked article according to claim 1, wherein said PTFE is raw PTFE.

6. A marked article according to claim 1, wherein said PTFE is sintered PTFE.

7. A marked article according to claim 1, wherein a marking contrast between said label marked with said laser on said surface of said article and a remaining portion not marked with said laser is greater than 70%.

8. A marked article according to claim 1, wherein a marking contrast between said label marked with said laser on said surface of said article and a remaining portion not marked with said laser is greater than 76%.

9. A marked article according to claim 1, wherein a marking contrast between said label marked with said laser on said surface of said article and a remaining portion not marked with said laser is greater than 82%.

* * * * *